Oct. 1, 1963 T. J. LYNCH 3,105,911

SOLID STATE ELECTRONIC COMMUTATOR

Filed Dec. 2, 1959 4 Sheets-Sheet 1

INVENTOR

Thomas J. Lynch,

BY Paris, Haskell and Levine

ATTORNEYS

INVENTOR
Thomas J. Lynch,
BY Paris, Haskell and Levine
ATTORNEYS

SOLID STATE ELECTRONIC COMMUTATOR

Filed Dec. 2, 1959 4 Sheets-Sheet 3

INVENTOR

Thomas J. Lynch,

BY Pavis, Haskell and Levine

ATTORNEYS

INVENTOR
Thomas J. Lynch,
BY
Paris, Haskell and Levine
ATTORNEYS 3,105,911

SOLID STATE ELECTRONIC COMMUTATOR

Thomas J. Lynch, Philadelphia, Pa., assignor to Vector Manufacturing Company, a corporation of Pennsylvania Filed Dec. 2, 1959, Ser. No. 856,763
14 Claims. (Cl. 307—88)

Figure 1:
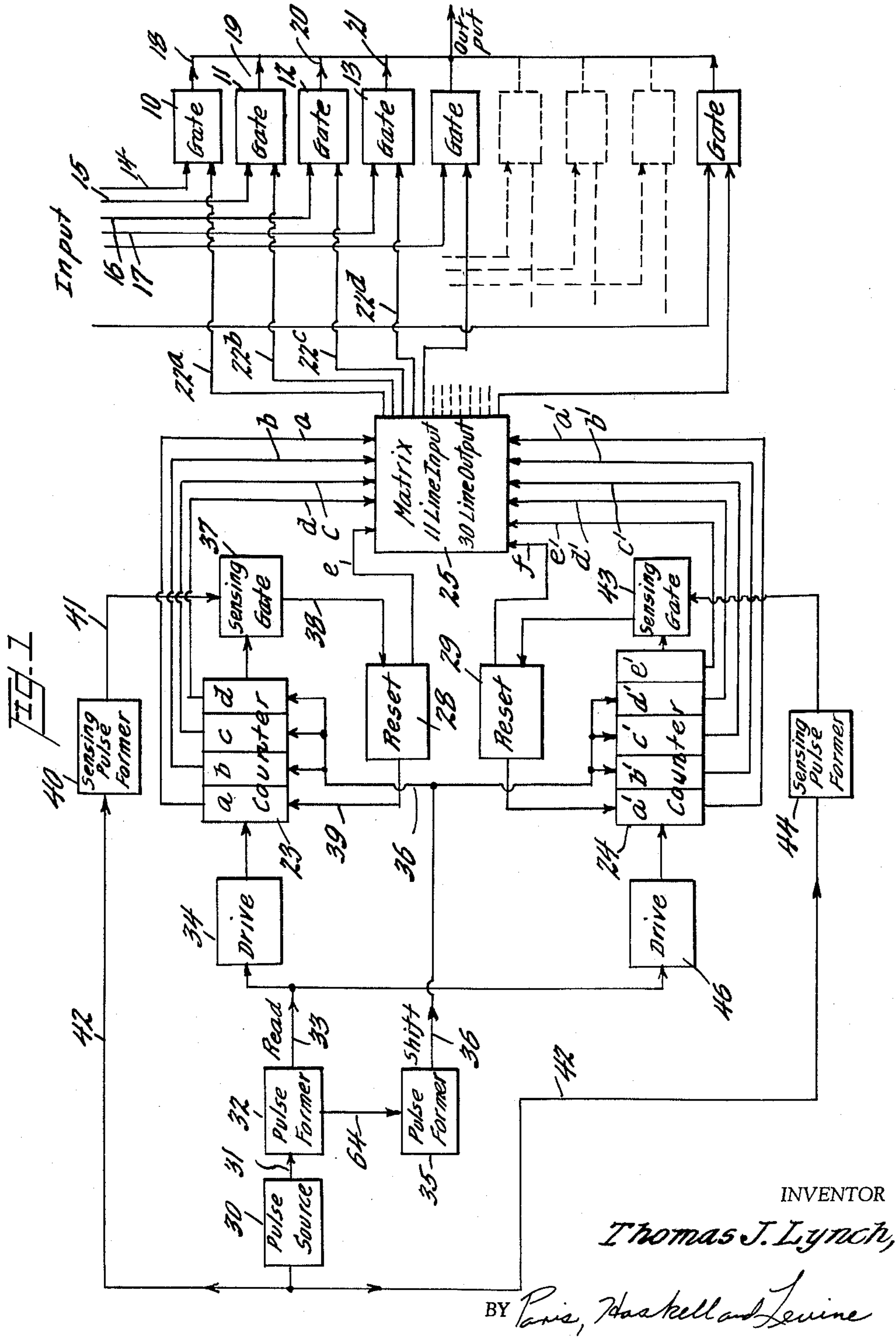

The invention generally relates to high speed commutator switching means useful in many applications and being particularly well suited for use in multichannel telemetering between ground and mobile stations.

The invention is particularly concerned with providing a small, compact, and lightweight commutator switching means operable at high speeds for aircraft and missile telemetering applications and that elimimates the need for electron tubes or other relatively fragile and undependable elements and employs instead solid state components such as magnetic cores and transistors.

In the past a variety of different commutator switching means have been employed for such applications including on the one hand such relatively unsophisticated devices as mechanical switches, and on the other, rather expensive silicon diode bridge gate circuits together with elaborate and expensive control circuits for operating the bridge. Since the rather standard switching rate adopted for aircraft telemetering is 900 contacts per second, the mechanical type switches obviously are not completely satisfactory and require a rather complicated and precise mechanism. Known electronic switches on the other hand using diode bridges do not isolate the switching control signals from the telemetered signal and require back biasing of the switch or other special techniques in order to function as desired. Other proposed electronic commutators require an unresonably large number of expensive components.

According to the present invention there is provided a commutator which may be generally characterized as being of the electronic variety, but is comprised exclusively of solid state components such as transistors and magnetic core circuits of types which are both inexpensive and readily available. In contrast to known electronic commutators, the system of the present invention is less complex and more dependable providing the advantages of the mechanical commutator systems without the disadvantages of requiring moving mechanical elements having make and break contractors.

It is accordingly a principal object of the invention to provide a high speed commutator switching means comprised exclusively of solid state components.

A further object is to provide such a commutator employing a minimum number of components compatibly with the number of switching circuits provided.

A still further object is to provide such a commutator switching system that may connect and disconnect low voltage signals without introducing spurious voltages or impedances in the signal circuits.

Another object is to provide an electronic commutator comprised exclusively of inexpensive and readily available components of miniature size and low power consumption and being combinable into a miniature package of small volume and lightweight.

Figure 2:
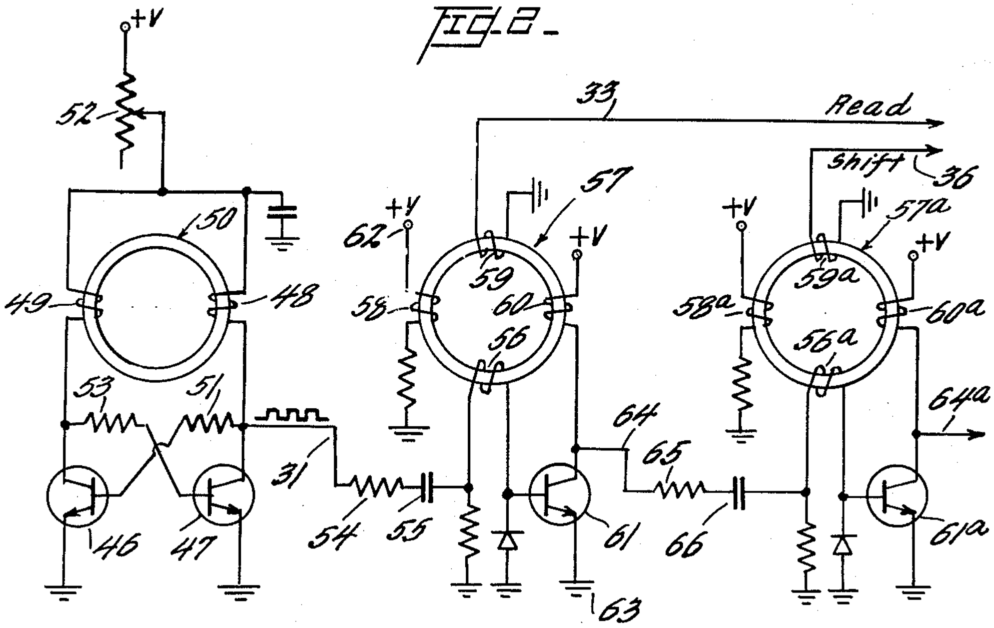
Figure 3:
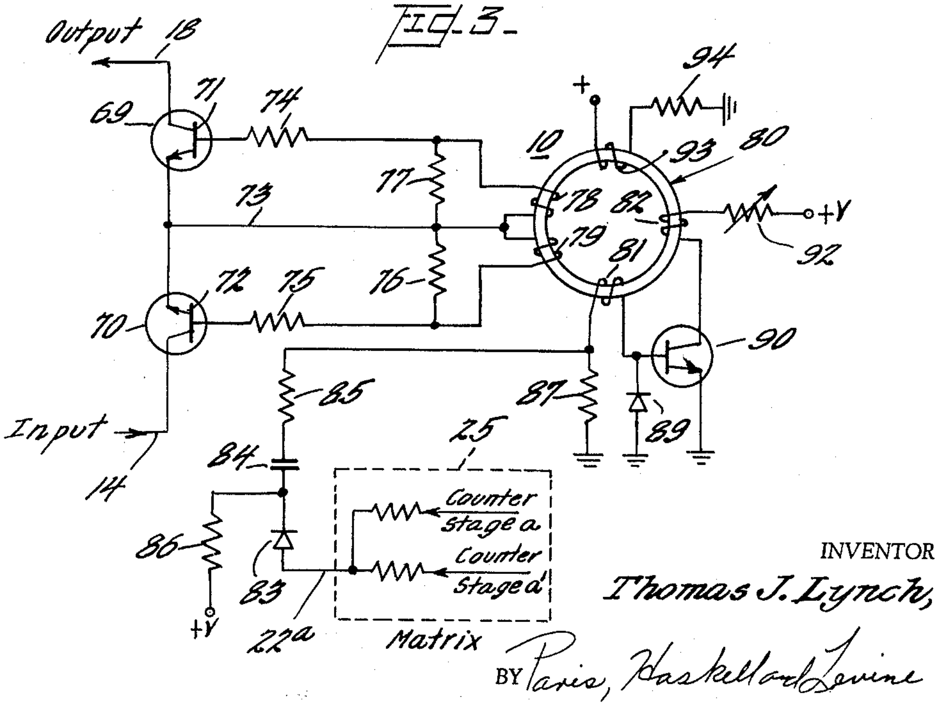
Figure 4:
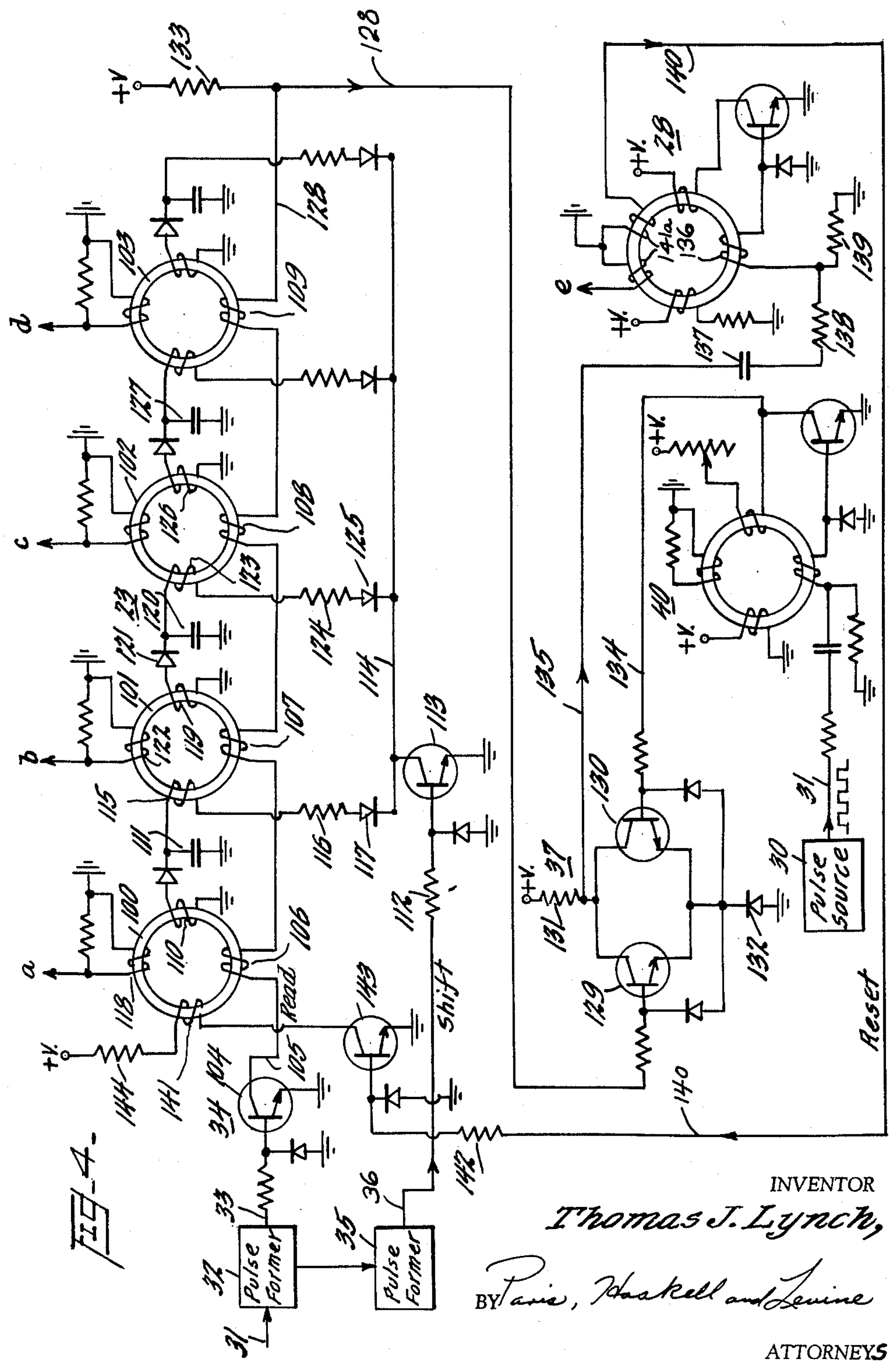
Figure 5:
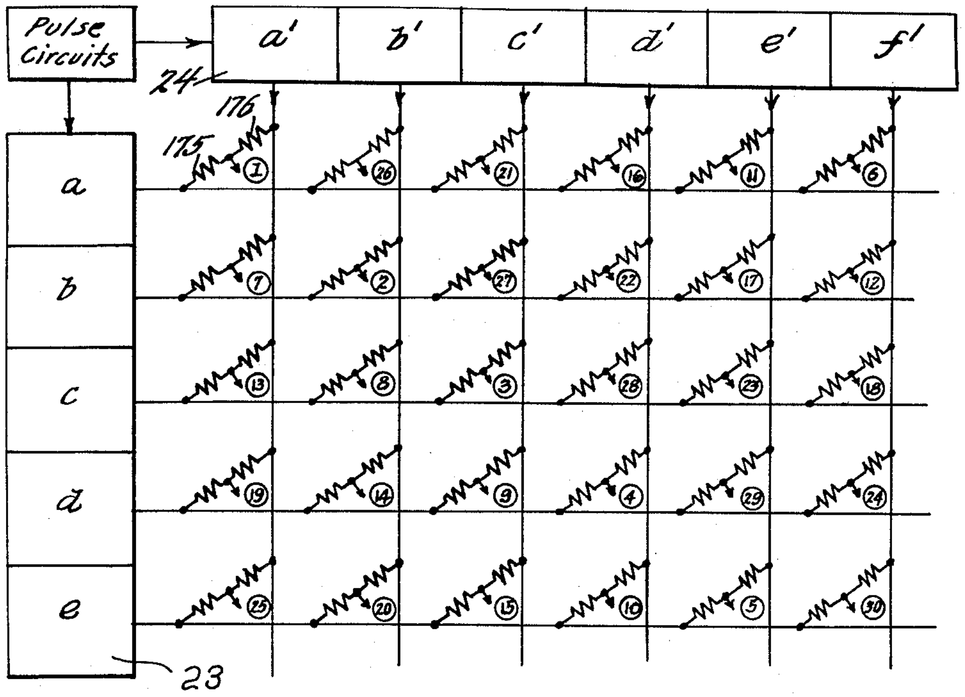
Figure 6:
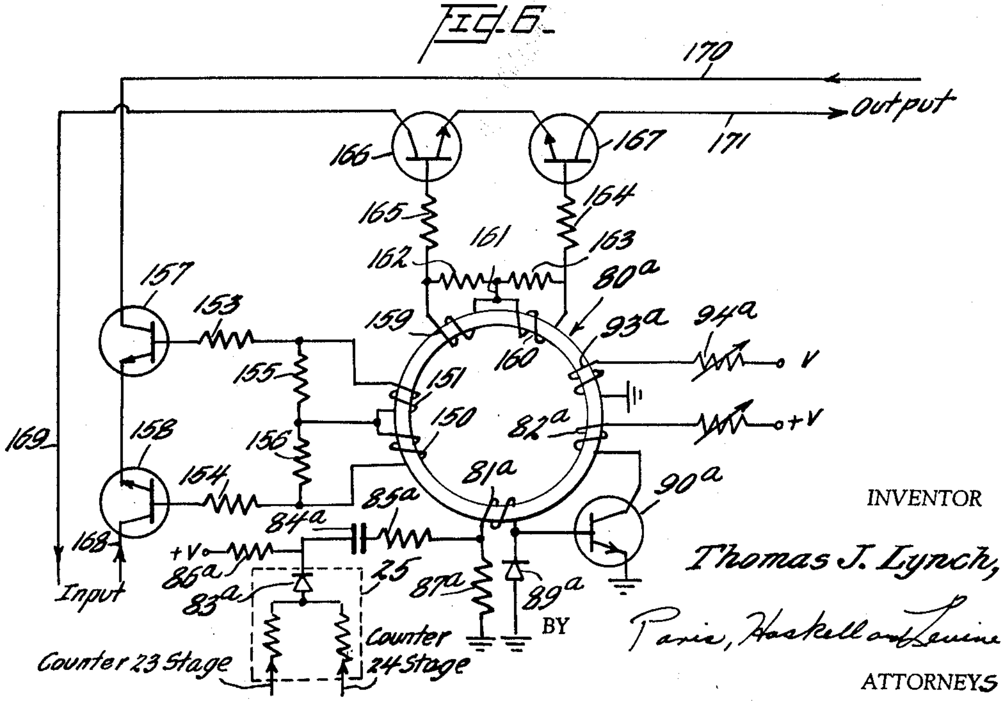

Other objects and many additional advantages will be readily understood by those skilled in the art after a detailed consideration of the following specification taken with the accompanying drawings wherein:

FIG. 1 is an electrical block diagram illustrating the overall preferred electronic commutator system according to the present invention, FIG. 2 is an electrical schematic diagram illustrating details of a preferred timing pulse source and pulse former circuits employed in the system of FIG. 1, FIG. 3 is an electrical schematic diagram illustrating details of a preferred gate circuit of FIG. 1, FIG. 4 is an electrical schematic diagram illustrating details of a preferred counter circuit of FIG. 1, FIG. 5 is an electrical diagrammatic representation of a preferred matrix circuit of FIG. 1, and FIG. 6 is an electrical schematic diagram similar to FIG. 3 and illustrating an alternative gate circuit for switching very low voltage signals.

Referring now to the block diagram of FIG. 1 for a general understanding of the over-all electronic commutator system according to the present invention, there is shown a plurality of gate circuits 10, 11, 12 and 13, each having an input line 14, 15, 16, and 17, respectively, and an output line 18, 19, 20 and 21, respectively. To function as a commutator each of these gate circuits is adapted to receive pulse energy in time sequence from a different control line 22*a*, 22*b*, 22*c* and 22*d*, respectively, thereby to connect and disconnect its input and output line in the same time sequence. As thus far described, therefore, each of the gates 10, 11, 12 and 13 function as electronic switches that are energized in step by step order to sequentially connect and disconnect their individual input lines to their output lines.

For sequentialy energizing each of the gate circuits, there is provided a pair of ring counters 23 and 24, which together operate a matrix generally indicated as 25. Matrix 25 is provided with a plurality of input lines, one line being connected to each different stage of both counters, and a plurality of output lines, a different one of which energizes each of the gate circuits.

As shown, ring counter 23 includes four stages, *a*, *b*, *c*, *d* and ring counter 24 includes five stages $a^1$, $b^1$, $c^1$, $d^1$, $e^1$. The output of each stage of counter 23 is connected to a different input line, *a*, *b*, *c*, and *d* leading to the matrix 25 and the output of each stage of counter 24 is likewise connected to the different line $a^1$, $b^1$, $c^1$, $d^1$, and $e^1$ to the matrix 25. In addition to the four stages of counter 23, there is provided what might be termed resetting stage 28 for this counter which functions as a fifth stage thereof, and the output of this fifth stage is directed over line *e* to the matrix. In a similar manner, there is provided a resetting or sixth stage 29 for counter 24, and the output of this stage 29 is directed over line *f* to the matrix 25. As thus far described, therefore, the matrix 25 is provided with a total of 11 input lines, divided in a first group of five input lines being taken from counter 23 and a second group of six input lines being taken from counter 24.

Counters 23 and 24 are adapted to be energized simultaneously with impulses from a regularly recurring pulse source 30 whereby each of the counters counts each succeeding pulse from the source in time sequence until it completes its cycle of operation. That is, counter 23 counts each of the first five pulses received from source 30, and is then reset or recycled in response to the fifth pulse to begin counting anew. Similarly, counter 24 sequentially counts the first six impulses received from source 30 and on the sixth impulse is recycled to again start counting anew. As each count is received, a different counter stage sequentially transmits a pulse over its output line to the matrix 25, whereby in response to the first pulse received from pulse source 30, lines *a* and $a^1$ are the only input lines to the matrix that are energized. On the second impulse transmitted from source 30, matrix lines *b* and $b^1$ are the only lines energized, and in response to the third impulse lines *c* and $c^1$ are energized. In this fashion, only two lines of the matrix are energized in response to any given pulse from the source 30. Matrix 25 may comprise nothing more than a plurality of coincidence circuits whereby when lines *a* and $a^1$ are energized only one output line of the matrix simultaneously receives pulse energy from these two lines. As will be described more fully hereafter, a matrix of this type having 11 input lines may be provided with 30 output lines, each being adapted to be energized sequentially in response to the first 30 impulses received from source 30.

It is believed evident that the counter 23, counter 24 and matrix may be designed to have any desired capacity and consequently the arrangement described is to be considered as exemplary rather than limiting.

As thus far described, there is provided a plurality of electronic gate circuits functioning as switches, with each being energized in time sequence to open and close thereby to commutate signals from the different input lines to the output lines thereof in the same time sequence. To energize the gate circuits in the time sequence desired, there is provided two counters 23 and 24, each having a different number of stages and a matrix 25, with the matrix adapted to simultaneously receive impulses from both counters and thereby to sequentially energize the individual gate circuits, as desired.

Considering more specifically the counters 23 and 24 and their mode of operation, the pulse source 30 produces a series of impulses over output line 31 to a first pulse former circuit 32. Pulse former circuit 32 produces a fixed waveform pulse over output line 33 in response to each energization, which impulse is directed through an amplifier inverter circuit 34 to read-in the pulse to counter 23 and is also directed through inverter 46 to simultaneously read-in the pulse to counter 24. Pulse former 32 also energizes a second pulse former 35 which in turn produces a second fixed waveform pulse that is time delayed from that being produced by the first pulse former circuit, and the second fixed waveform impulse is directed over output line 36 and into all the stages of the counter 23 and 24 for purposes of shifting or transferring the count from stage to stage. When counter 23 has detected a total of four pulses, the next succeeding pulse or fifth pulse received conditions the counter in such manner that a sensing gate 37 connected to the output thereof, notes that five counts have been received and transmits a signal over line 38 to a reset pulse former 28, which in turn produces a fifth output pulse over line *e* to the matrix and also resets the counter over line 39. Thus, after counter 23 has detected a total of five impulses, the sensing gate 37 and reset pulse former 28 serve to reset the counter 23 for a new cycle of operation, and also produce a fifth output pulse over line *e* to the matrix indicating the count of five.

To control the sensing gate 37 in the manner described, there is provided a sensing gate pulse former circuit generally designated 40 which simultaneously energizes the sensing gate 37 over line 41 in response to each pulse being produced by pulse source 30. The sensing gate 37 does not respond to these impulses from circuit 40 until counter 23 has detected the five impulses and been conditioned thereby. However when this fifth impulse has been detected in coincidence with the operation of the sensing gate pulse former 40, the reset stage 28 is activated as described above to reset the counter 23 and also transmit a pulse over line *e* to the matrix 25.

The construction of counter 24 is preferably the same as that of counter 23 with one additional stage $e^1$. Counter 24 is also provided with an input amplifier and inverter 46, a sensing gate 43, a sensing gate pulse former 44, and a reset pulse former 29, all being constructed and interconnected in the same manner as the circuits employed with counter 23 and described above.

Recapitulating the over-all operation of the electronic commutator system, as illustrated in FIG. 1, there is provided a plurality of gate circuits each functioning as an electronic switch, and each adapted to be energized in time sequence thereby to close and open its switching means, as desired. For sequentially energizing each of the gate circuits, there is provided a pair of ring counters 23 and 24, and a matrix 25, with the matrix 25 being energized by the individual stages of the counters in such manner as to sequentially energize its output lines 22*a*, 22*b*, and 22*c* and 22*d*, thereby to energize the gate circuits in the time sequence desired. The counters 23 and 24 are both simultaneously energized by a recurring source of pulses from source 30 and each counter detects each of the incoming pulses and transmits pulses representative thereof over the output lines of its stages. Each of the counters 23 and 24 is also provided with resetting means which function to recycle the counters over and over again, whereby as each counter receives its capacity of pulses, it is reset and commences to count over again.

Referring now to FIGS. 2 to 6 for an understanding of the preferred circuits for performing each of the functions described above, FIG. 2 illustrates a preferred pulse generator 30. As shown, the pulse generator 30 comprises a multi-vibrator having a pair of transistors 46 and 47 connected back-to-back in feedback relation with windings 48 and 49 wound about a saturable core 50 having square hysteresis loop characteristics. More specifically, the base element of transistor 46 is connected through a resistor 51 to the collector element of transistor 47 and to winding 48 having its opposite terminal energized by a positive source of potential through a limiting resistance 52. In an identical manner, the base element of transistor 47 is connected through a resistor 53 to the emitter element of transistor 46 and is also connected to the lowermost terminal of the second winding 49 on core 50 whose opposite terminal is energized by the source of D.-C. potential. As known in the art, with this type of fedeback between the transistors and through the medium of the saturable core, this circuit may be designed to oscillate back and forth and produce a substantially square wave pulse output having a fixed pulse width. The output of multi-vibrator 30 is directed over output line 31 and through a coupling circuit comprised of resistor 54 and capacitor 55 to the input winding 56 of a pulse former circuit.

The pulse former circuit preferably comprises a magnetic core 57 having square hysteresis loop characteristics and having an input winding 56, a resetting winding 58, an output winding 59, and a regenerative feedback winding 60. As each impulse over line 31 passes through input coil 56, it energizes the base element of a transistor 61, thereby permitting electrical conduction from the collector to the emitter element thereof. Tracing this latter conduction path, it is noted that the emitter to collector junction of 61 is connected in series circuit with feedback coil 60 and a D.-C. energizing potential to ground. Consequently, as the impulse is received at its base element, and transistor 61 permits conduction from its emitter to collector elements, a current flow passes through feedback winding 60 in a direction to induce a voltage in winding 56 in a direction to maintain transistor 61 conducting and thus enable continued current to pass through winding 60 until the core 57 is fully saturated. As a result a small triggering impulse of short duration is sufficiently amplified by the transistor 61 and feedback winding 60 in such manner as to reverse the direction of saturation of core 57 and produce a constant volt time impulse over output winding 59. Thus, the combination of a single saturable core 57 and transistor 61 in the circuit described operates as a pulse former in response to each triggering impulse received from the multi-vibrator to generate a constant wave-shaped output pulse over output winding 59 and over read line 33.

At the termination of this constant wave-shaped output pulse, the core 57 is fully saturated in the reverse direction and transistor 61 is switched to its "off" condition and windings 56 and 60 are deenergized. For restoring the saturable core 57 to its initial direction of saturation, thereby to condition the circuit for the next input pulse received, the bias coil 58 receives current from a D.-C. voltage source 62 to ground, as shown, that is sufficiently to ultimately again reverse the saturation of core 57 inbetween each impulse and restore it to its initial condition. Although the biasing winding 58 is continuously energized by the direct current source 62, the regenerative feedback being provided by windings 56 and 60 are sufficient to overcome this bias upon the circuit receiving an input pulse and thereby reverse the state of saturation of the core as described above. Thus the pulse former circuit produces a constant wave-shaped pulse in response to each impulse received and after generating this impulse is automatically reset to its initial condition to receive the next incoming impulse from multi-vibrator 30.

In addition to producing a constant wave-shaped output pulse over line 33, a second output from the pulse former circuit is taken from the emitter element of transistor 61 and directed over line 64 to a second pulse former circuit, generally indicated by the number 35 in FIG. 1. However, since transistor 61 functions as a switch in permitting saturation of core 57 in response to each input pulse, during the time interval that the output pulse is being transmitted from the first pulse former circuit, the emitter element of transistor 61 is effectively connected in potential to the ground line 63 and no pulse is transmitted over the second output line 64. However, after the termination of the output pulse from the first pulse former circuit, the transistor 61 is made non-conducting and the impedance existing between the emitter and collector elements thereof is raised from ground potential at 63 to the potential of the D.-C. source. Consequently, the impulse being directed over line 64 and to the second pulse former circuit 35 is time delayed to occur at the termination of the pulse from the first pulse former 32. This time delayed pulse over line 64 is thence directed through a coupling circuit comprised of resistor 65 and capacitor 66 to the input winding 56*a* of the second pulse former circuit.

The second pulse former circuit is substantially identical in all respects with the first pulse former circuit and consequently produces a constant wave-shaped impulse over output line 36, which is time delayed to occur at the termination of the pulse being produced by the first pulse former circuit.

In FIG. 4 there is shown details of the preferred counter circuit of FIG. 1, together with details of the preferred associated circuitry including the amplifier-inverter drive circuit 34, the sensing gate circuit 37, the sensing gate pulse former circuit 40, and the reset pulse former circuit 28, all as shown in block diagram found in FIG. 1.

Referring to FIG. 4, the counter 23 generally comprises a plurality of saturable cores 100, 101, 102, and 103, with one core being provided for each stage of the counter. Each of these cores are formed of material having a substantially square hysteresis loop characteristic and are adapted to change their direction of saturation in response to the incoming pulses, changing from a 0 condition having one direction of saturation to a 1 condition having a reverse direction of saturation.

The input pulses being generated by the source 30 over line 31 are first directed to a pulse former circuit 32 for the purpose of obtaining constant wave-shaped pulses to energize the counter. These constant wave-shaped pulses are then passed through an inverter circuit 35 that may comprise a single transistor 104 having a base element connected to line 33 to receive the impulses, and transmitting an impulse of the opposite polarity from its collector element and over line 105. These reverse polarity pulses over line 105 are then directed to an input winding on each of the cores; all of said windings 106, 107, 108 and 109 being connected in series to each receive the input pulses from line 105. Assuming initially that only the first core 100 is saturated in a reverse direction, or is in the 1 condition, and all other cores 101, 102, and 103 are in the 0 condition, then the first impulse over line 105 reverses the saturation condition of only the first core 100 as it passes through input coil 106, but does not affect the saturation condition of the other cores. Thus, after receiving the first impulse, the saturation condition of the first core 100 is reversed to the 0 condition, and the saturation condition of the remaining three cores 101, 102, and 103 are unchanged and remain in the 0 condition.

As the direction of magnetic saturation of the first core 100 is reversed from the 1 condition to the 0 condition, a change of flux occurs through the core and induces a voltage across output winding 110, which in turn charges a capacitor 111 connected to this winding, as shown. Thus, in response to the first read-in impulse, the saturation of core 100 is reversed and a charged voltage is produced across a capacitor 111.

After the termination of the first read-in impulse over line 105, the pulse former circuit 35 produces a time delayed shift impulse over line 36 as discussed above. This shift pulse over line 36 is directed through a resistor 112 to the base element of a transistor 113 operating a switch, and rendering the transistor 113 conductive between its emitter and collector elements. The collector element of transistor 113 is connected to a line 114 and the emitter element of transistor 113 is connected to ground. Consequently line 114 is thence connected to ground upon transistor 113 receiving the shift pulse over line 36. As line 114 is grounded, the lowermost terminal of winding 115 on the second core 101 is likewise grounded through a resistor 116 and diode 117, thereby completing a circuit from the capacitor 111 and through the winding 115 to ground. This enables the capacitor 111 to discharge through winding 115 in a direction to reverse the saturation of core 101. The discharging of capacitor 111 through winding 115 reverses the direction of saturation of the second core 101, changing the condition of the second stage 101 from a 0 to a 1 condition. Thus, at the termination of the first shift impulse over line 36, the core 100 of the first stage is in the 0 condition and the core 101 of the second stage is in the 1 condition, and the two remaining cores 102 and 103 of the third and fourth stages remain unchanged and in the 0 condition.

Additionally, when the first stage varies from its 1 to its 0 condition, the reversal of flux through the core also produces a voltage across output winding 118 wound about this core is such a direction as to produce a positive output impulse over line *a*, signifying that a count has been received and that the counter has counted one impulse.

Upon receiving the second read-in pulse over line 105, the only core in a saturation condition to be affected by this pulse is the core 101 of the second stage, which is now in its 1 condition, since all other cores are in their 0 condition, as discussed above. Consequently, the second read-in pulse in passing through input winding 107 of the second core 101 reverses the direction of magnetic saturation of this core and changes this core back to its original or 0 condition. In reversing the direction of saturation, a potential is induced across winding 119 wound about this core, thereby storing a charge on capacitor 120 connected to winding 119 through a diode 121. This reversal of saturation also produces a voltage across the output coil 122 transmitting an impulse over the output line *b* of the second stage and indicating that the counter has received a total of two read-in or input pulses.

To transfer the charge on capacitor 120 to the third stage core 102 and thereby condition the third stage to count, the second shift pulse over line 36 received shortly after the second read-in pulse is directed to operate transistor switch 113 and connect line 114 to ground. As in the first transfer operation, the connection of line 114 to ground completes a circuit from the charged capacitor 120 through the input winding 123 on the third core and through a resistor 124 and diode 125 to ground, thereby enabling the charge on capacitor 120 to be discharged through input winding 123 on the third core 102. As discussed above, this discharge of current through winding 123 reverses the direction of saturation of core 102, changing the third stage from a 0 condition to a 1 condition, and thereby conditioning the third stage to respond to the third read-in or input impulse over line 105. Upon receiving this third read-in pulse, the core 102 is then reversed again from its 1 condition and back to its 0 condition, producing an output pulse over output line *c* of the counter, and thereby indicating that the counter has received a total of three impulses. This third read-in pulse also operates to charge a capacitor 127 connected to output coil 126 of the third stage in the same manner as discussed above.

In the manner described, each of the stages in sequence is adapted to be charged from a 1 condition to a 0 condition in response to each read-in or input pulse and thus produce an output pulse from the different stages of the counter indicating the number of pulses that have been received. In the interval between said input or read-in pulses, the time delayed shift pulse over line 36 serves to transfer the count from stage to stage by changing its condition from a 0 to a 1 condition, thereby rendering it responsive to the next succeeding read-in pulse impulse. To prevent the changes in saturation from a 0 condition to a 1 condition from charging up the output capacitor connected to each stage, the diodes, such as 121, connected with the capacitors respond only unidirectionally to the change of state of the cores whereby each of the stages functions as described above.

After the fourth read-in or input pulse has been received, and has changed the last core 103 from its 1 condition to its 0 condition, all of the cores 100, 101, 102 and 103 are then in the 0 condition, indicating that the counter has counted a total of four read-in or input pulses. Upon the fifth input pulse being directed over line 105, no one of the first four counter stages is in condition to respond thereto since all stages are saturated in such direction as to be unresponsive to this impulse. Additionally, since all these four stages are saturated in the same direction as would be provided by this pulse, the impedance represented by the series input windings 106, 107, 108 and 109 is very low and the impulse is passed through all of these windings and over line 128 to the sensing gate circuit generally designated 37.

The sensing gate circuit generally comprises a pair of transistors 129 and 130 connected with their collector to emitter elements in a parallel circuit arrangement and being jointly energized by a positive D.-C. voltage through a resistor 131 and in series with a reversely poled diode 132. The base element of transistor 129 is connected to line 128 leading to the series input windings of the first four stages of the counter, and the base element of transistor 130 is connected to the sensing gate pulse former circuit generally designated 40. While the first four stages of counter 23 are operating, the impedance presented by their input windings to the read-in impulse is sufficiently great to prevent the negative going read-in impulse from affecting the operation of transistor 129, since these pulses over line 128 do not have a sufficient negative amplitude to cut off the conduction of transistor 129, which is normally positively biased by a positive source of potential and through a resistor 133, as shown. However, when all four stages of the counter are in their 0 condition, the fifth read-in impulse is transmitted over line 128 with sufficinet amplitude to cut off the conduction normally flowing from the emitter to the collector of transistor 129. Simultaneously with this occurring, the current conduction through transistor 130 is also cut off in response to an impulse from pulse source 30 being directed through a pulse former circuit 40 and upwardly to the base element of transistor 130 over line 134. As both transistors 129 and 130 are made non-conducting simultaneously, the potential at the collector elements of transistors 129 and 130 is increased to that of the positive voltage source since no current is drawn through resistor 131. Consequently, a positive going impulse is transmitted over line 135 connected to the emitter elements of these transistors, and this positive going impulse passes over line 135 to the input windings 136 of a reset pulse former circuit 28. The reset pulse former thereupon reverses its direction of magnetic saturation and winding 141*a* thereon transmits an output pulse over line *e* to the matrix 25 indicating that the counter 23 has received a total of five read-in or input pulses. Additionally, winding 141*a* transmits a reset impulse over an output line 140 which is directed backwardly and through transistor 143 to reset winding 141 on the first core 100 of the counter, thereby to reverse the direction of saturation of the first core and change the core from 0 to a 1 condition and condition the counter to recycle and commence counting anew upon receiving the sixth read-in impulse. Tracing this reset impulse from winding 141*a*, it is directed backwardly over line 140 and through a resistor 142 to the base element of a transistor 143 operating as a switch. The emitter element of transistor 143 is connected to ground and the collector element thereof is connected to winding 141 on the first core 100, as shown. The opposite terminal of winding 141 is connected to a positive source of voltage through a resistor 144 whereby upon transistor switch being closed to conduct current from its collector to its emitter element, current from the positive source may pass through resistor 144 and energize winding 141 in the manner described above to reset the first stage of the counter from a 0 to a 1 condition as desired.

FIG. 3 shows details of a preferred gate circuit employed in the system of FIG. 1. As shown, the gate circuit includes a saturable magnetic core 80 having an input winding 81, a feedback winding 82, a reset winding 93 and a pair of output windings 78 and 79.

Assuming that the gate circuit illustrated corresponds to the first gate 10 in FIG. 1, the input winding 81 is connected to the first stage *a* of counter 23 and to the first stage $a^1$ of counter 24 through the matrix 25. Upon the first impulse being simultaneously detected by both counters 23 and 24, the output lines of stages *a* and $a^1$ are both positively energized at the same time, and a resulting positive going impulse is produced over line 22*a* leading from the matrix 25 and being directed to the input winding 81 after passing through diode 83, capacitor 84 and resistor 85. The pulse through winding 81 begins to reverse the direction of saturation of core 80 and also passes through the winding 81 to positively energize the base element of transistor 90 permitting current flow from the collector to the emitter element thereof. The transistor 90 functions as a switch in response to this pulse to thereafter enable current to flow through feedback winding 82 on core 80, producing a changing flux through the core in a regenerative or aiding direction to that of input winding 81, whereupon the core is progressively saturated in the reverse direction until it reaches a fully saturated condition. As thus far described, the gate circuit is substantially identical to the pulse former circuits described above in FIG. 2.

To utilize this technique in opening and closing a switching means for gating purposes, there is provided a pair of output windings 78 and 79 on the core 80 which are connected in series circuit arrangement with a common terminal 73. The opposite terminal on the upper winding 78 is connected to energize the base element 71 of a switching transistor 69 and the opposite terminal of lower winding 79 is likewise connected to energize the base element 72 of a second switching transistor 70.

Transistors 69 and 70 are connected back-to-back and in series circuit relationship with the input signal line 14 and output signal line 18. That is, the input signal over line 14 leading to the gate is directed to the collector element of transistor 70 whose emitter element is in series with the emitter element of transistor 69, and the output signal line 18 leading from the gate is connected to the collector element of transistor 69. With this arrangement, when transistors 69 and 70 are both non-conducting, the impedance existing in the series circuit from input line 14 to output line 18 is extremely high and the signal cannot pass through the transistors from the input line 14 to output line 18. On the other hand if both transistors 69 and 70 are simultaneously made conducting, this impedance drops to an extremely low or negligible value, effectively connecting the input line 14 to output line 18 to pass even a low amplitude signal therebetween. Since the transistors 69 and 70 are reversely poled or in back-to-back relationship, this high impedance is present in both directions for A.-C. signals whenever both transistors 69 and 70 are non-conducting.

To control the operation of both transistors together, rendering them both either conducting or non-conducting as dictated by the functioning of the gate circuit, the pair of output windings 78 and 79 on the core 80 are preferably oppositely wound thereon, whereby as the core is driven to saturation in the reverse direction, the changing flux through the core induces a voltage in the upper winding in a direction to render transistor 69 conducting and this flux change simultaneously induces a voltage in the lower winding to also render transistor 70 conducting, whereby the gate circuit is closed and the input line 14 is connected to the output winding 18 as is desired.

Thus, upon receiving a triggering or control impulse from matrix 25 and over line 22*a* the direction of saturation of the core 80 is reversed in a fixed short time interval producing a changing flux through the core. This changing flux induces voltages in both windings 78 and 79 in such direction as to simultaneously render both transistors 69 and 70 conducting, whereupon the gate is closed for a predetermined time interval, determined by the design of the magnetic core and its energizing circuits, permitting the signal from the input line 14 to pass through the transistors 69 and 70 to the output line.

After this predetermined time interval has expired and the core 80 is fully saturated in the reverse direction, the flux change through the core 80 ceases and the induced voltages in windings 78 and 79 drop to zero. In this manner the base elements of transistors 69 and 70 are deenergized rendering the transistors 69 and 70 non-conducting and opening the gate circuit to effectively disconnect the output line 18 from input line 14.

To recondition or reset the gate circuit for subsequent operation, there is provided a resetting winding 93 that is continuously energized by a D.-C. source through a current limiting resistor 94 in a direction to restore the direction of saturation of core 80 to its initial condition. Consequently, after each operation of the gate circuit, the direction of saturation of the core is restored to its initial condition by energized reset winding 93, but during the functioning of the gate in response to the matrix triggering impulse, the reverse magnetizing force provided by feedback winding 82 predominates to reverse the direction of saturation, as described above.

During such resetting of the core, the flux change through the core also induces a voltage in output windings 78 and 79, as well as in input winding 81. However, since the direction of flux change is opposite to that occurring during operational functioning of the gate circuit, these voltages induced are in the opposite direction and do not render gate transistors 69 and 70 or input transistor 90 conducting.

The gate circuit of FIG. 3 provides sufficiently high impedance when the gate is open and low impedance when closed to connect and disconnect input signals from line 14 in the range of 0 to five volts or higher to the output line 18. The return path (not shown) is connected through ground. However, in the event that the commutator system is to switch in and out low level signals in the order of zero to ten millivolts, the alternative gate circuit shown in FIG. 6 is preferred.

Referring to FIG. 6, it is noted that the magnetic control circuit is identical in all respects with that of FIG. 3 and includes a saturable core 80*a* having an input winding 81*a*, feedback winding 82*a* and resetting winding 93*a*, all being interconnected to function in the same manner as the same elements in FIG. 3, and with the elements thereof being similarly numbered as in FIG. 3, but bearing the subscript *a*. However, instead of providing only one output line circuit with the series connected transistor elements therein and using a ground line as a return path, the gate circuit of FIG. 6 employs a pair of output circuits, with switching transistors 157, 158 and 166, 167 in each line, respectively. This configuration isolates the low level input signal over lines 168 and 169 from ground, as well as providing a higher impedance between the input and output lines when the gate circuit is open, all as is desired for gating low level signals.

More specifically, there is provided a first pair of series connected output windings 150 and 151 serving to operate transistors 157 and 158 between input line 168 and output line 170, and a second pair of series connected output windings 159 and 160 serving to operate transistors 166 and 167 between the second input line 169 and output line 171. All of these windings are so arranged on core 80*a* that during the reverse saturation of core 80*a* as initiated by a triggering pulse, all four transistors are rendered conducting, whereas during resetting of the core, all four transistors are made non-conducting.

In FIG. 5 there is shown one preferred matrix circuit 25 employed in the system of FIG. 1 and having five horizontally represented input lines *a*, *b*, *c*, *d*, and *e* leading from the five stages of counter 23 and six vertically represented input lines $a^1$, $b^1$, $c^1$, $d^1$, $e^1$, and $f^1$ leading from the six stages of counter 24.

As shown, each of the indivdual horizontal lines *a*, *b*, *c*, *d*, and *e* from the stages of counter 23 are connected to all of the individual lines from the stages of counter 24 with each connection being through a pair of resistors such as 175, 176 making a total of thirty such connections. In other words, the total number of such connections is equal to the product consisting of the number of stages of one counter times the number of stages of the other. Since the counters 23 and 24, each have a different number of stages, it is believed evident that in response to the different input pulses being simultaneously directed to both counters, a different one of said connections will receive maximum energization. For example, in response to each of the first five impulses received by the counters, the resistor connections between line *a* and $a^1$ first receives maximum energization; then the junction of *b* and $b^1$; then the junction of *c* and $c^1$; then the junction of *d* and $d^1$; and finally the junction of *e* and $e^1$; all as shown by the circled numbers in the drawing at the junction of the connected resistors. However, upon the sixth input impulse being generated, the counter 23 is recycled to begin counting anew, whereas the last stage $f^1$ of counter 24 is being energized. Consequently, upon receiving the sixth impulse the resistor junction between lines *a* and $f^1$ receives maximum energization. On the seventh impulse, the second stage *b* of counter 23 responds as counter 24 is being recycled whereby the junction between stage *b* and $a^1$ receives maximum energization. Continuing this analysis of the matrix, it is observed that a different one of the junctions receives maximum energization in response to each succeeding impulse directed to the counter circuits, whereby the thirty output lines leading from the matrix are each energized in time sequence to open the gate circuits as described above.

What is claimed is:

1. In an electronic commutator for sequentially closing a number of electronic switches, a plurality of counters each having a different count capacity equal to an integral submultiple of the number of switches, a matrix having a number of input lines equal to the sum of the count capacity of said counters and a number of output lines equal to the product thereof, means connecting the counters to energize the input lines of said matrix, a plurality of gate circuit switches, each being energizable by a different output line of said matrix, and means connecting all said counters to simultaneously receive counting pulses from a pulse source.

2. In the commutator of claim 1, each of said counters comprising a plurality of magnetic stages each having a saturable core of substantially square hysteresis loop characteristics.

3. In the commutator of claim 1, each of said gate circuits including a saturable core of substantially square hysteresis loop characteristics.

4. A solid state electronic commutator comprising a plurality of multi-stage counters with each stage being comprised of solid state and magnetic components, a matrix having a number of input lines equal to the sum of the stages of all counters and a number of output lines equal to the product thereof, a plurality of gate circuits, each being comprised exclusively of solid state and magnetic components, with a different one of each of the gate circuits being connected to a different output line of the matrix, means connecting the counter stages to simultaneously receive impulses from an impulse source; and means connecting each stage of the counters to a different input line of the matrix.

5. In a solid electronic commutator, a plurality of gate circuits each having a magnetic core of substantially square hysteresis loop characteristics with input, output, and control windings thereon and a transistor feedback control circuit connected to said control windings thereon and being responsive to an impulse of short duration for reversing the direction of saturation of the core in a predetermined manner, a biasing winding on said core and responsive to energization to restore the core to its original state of saturation, means for sequentially applying short duration pulses to each of said gate circuits in timed sequence responsively to a source of timing pulses, a pair of solid state switching means in a bridge circuit connected to the ouput winding on each said core and being polarity responsive to the reversal of saturation of said core from its initial state to permit electrical conduction therethrough.

6. In a solid state electronic commutator, a plurality of gate circuits each responsive to a control impulse of short duration for permitting electrical conduction therethrough for a fixed time interval unrelated to the duration of the control impulse, a plurality of ring counter circuits each comprised of a plurality of stages having a magnetically saturable core, means connecting said counters to simultaneously receive timed impulses from a source, and a coincidence network having input terminals connected to the individual stages of all counters and output terminals connected to said gate circuits for sequentially directing control impulses to said gates responsively to impulses from said source.

7. Means for sequentially energizing a plurality of output lines responsively to successive pulses from a pulse source comprising: a plurality of multistage counters each having a different number of stages equal to a different integral submultiple of the number of output lines, a matrix having a number of input lines equal to the sum of the stages of all counters and said output equal to the product thereof, means connecting each stage of the counters to a different input line of the matrix, and means connecting all of said counters to simultaneously receive pulses from said source.

8. In the device of claim 7, said plurality of counters comprising two multistage counters with one of said counters having one stage more than the other.

9. In an electronic commutator, a plurality of automatically resetting gate circuits each responsive to a control impulse of short duration for closing an electronic switch for a fixed time duration unrelated to the duration of the control impulse, and means for separately applying to one terminal of each of the switches a different input signal to be commutated and separately obtaining from another terminal of the switch said substantially identical input signal but only for the fixed duration of operation of that gate, a pulse producing matrix having a number of output lines corresponding to the number of gate circuits, with each different output line connected to a different gate circuit to supply the control impulse thereto, said matrix having two sets of input lines with the number of input lines in each set being different and the products of the two sets equaling the number of gate circuits, a pair of pulse counter circuits each having a different number of stages with the sum of the stages of both counters being two less than the number of input lines to the matrix, a reset circuit for each counter being responsive to each counter completing its cycle of operation for resetting that counter to its initial condition, each said reset circuit being interconnected to an input line in a different set of the matrix, a pulse producing source for simultaneously driving both counters at a regularly recurring rate, and means interconnecting each of said reset circuits to be energized by said pulse producing source whereby each reset circuit upon detecting the completion of the count of its related counter is energized by the next regular recurring pulse from the pulse source to reset its counter and energize said matrix.

10. In the commutator of claim 9, said pulse producing source having a pair of outputs each producing said regularly recurring pulses but with the pulses at one of the outputs being time delayed from those at the other output, and the stages of both said counters being energized by both outputs, said one output shifting the count received by the stages in sequence, one to the next, and said other output sequentially entering pulses to be counted.

11. In an electronic commutator, a plurality of automatically resetting gate circuits each responsive to a control impulse of short duration for closing an electronic switch for a fixed time duration unrelated to the duration of the control impulse, and means for separately applying to one terminal of each of the switches a different input signal to be commutated and separately obtaining from another terminal of the switch said substantially identical input signal but only for the fixed duration of operation of that gate, means for sequentially energizing each of said gate circuits, said means including a storage mechanism having a different control output line for each of said gate circuits and a pulse producer circuit producing two series of regularly recurring pulses for energizing said storage mechanism, with the pulses of one series being delayed from those of the other series.

12. In an electronic commutator, a plurality of automatically resetting gate circuits each responsive to a control impulse of short duration for closing an electronic switch for a fixed time duration unrelated to the duration of the control impulse, and means for separately applying to one terminal of each of the switches a different input signal to be commutated and separately obtaining from another terminal of the switch said substantially identical input signal but only for the fixed duration of operation of that gate, a pulse producing matrix having a number of output lines corresponding to the number of gate circuits, with each different output line connected to a different gate circuit to supply the control impulse thereto, said matrix having two sets of input lines with the number of input lines in each set being different and the product of the two sets equaling the number of gate circuits, a pair of pulse counter circuits each having a different number of stages with the sum of the stages of both counters being two less than the number of input lines to the matrix, a reset circuit for each counter being responsive to each counter completing its cycle of operation for resetting that counter to its initial condition, each said reset circuit being interconnected to an input line in a different set of the matrix, a pulse producing source for simultaneously driving both counters at a regularly recurring rate.

13. In an electronic commutator, a plurality of automatically resetting gate circuits each responsive to a control impulse of short duration for closing an electronic switch for a fixed time duration unrelated to the duration of the control impulse, and means for separately applying to one terminal of each of the switches a different input signal to be commutated and separately obtaining from another terminal of the switch said substantially identical input signal but only for the fixed duration of operation of that gate, a pulse producing matrix having a number of output lines corresponding to the number of gate circuits, with each different output line connected to a different gate circuit to supply the control impulse thereto, said matrix having two sets of input lines with the number of input lines in each set being different and the product of the two sets equaling the number of gate circuits, and a pulse producing circuit for sequentially energizing different ones of the two sets of input lines in a given time sequence whereby control impulses are produced over each one of the matrix output lines in sequence.

14. A commutating system for sequentially closing a plurality of switch means in time sequence with each switch being closed for a predetermined time interval comprising: means having a plurality of output lines equal to the number of switches and adapted to produce a triggering impulse over each line in time sequence, and a plurality of magnetically operating switch means each being responsive to the impulse over a different one of said lines to remain closed for a predetermined time interval after receiving said triggering pulse and then automatically open and remain open until receiving the next triggering impulse, said switch means including a saturable core having square hysteresis loop characteristics and being adapted to assume fully saturated conditions in opposite directions, an input winding and feedback winding on said core, and means interconnecting said winding regeneratively whereby current through the feedback winding induces a voltage in said input winding in a direction controlling said means to permit continued current flow through the feedback winding until the core is progressively fully saturated in one direction after a given time interval, an output winding on said core receiving an induced voltage during said time interval, and an electron valve serving as a switch and responsive to said induced voltage to control the current therethrough.

References Cited in the file of this patent

UNITED STATES PATENTS

| | | |
|---|---|---|
| 2,734,187 | Rajchman | Feb. 7, 1954 |
| 2,821,639 | Bright et al. | Jan. 28, 1958 |
| 2,888,667 | Schmitt | May 26, 1959 |
| 2,899,571 | Myers | Aug. 11, 1959 |
| 2,905,932 | Ruhman | Sept. 22, 1959 |
| 2,907,894 | Bonn | Oct. 6, 1959 |
| 2,912,681 | Paull | Nov. 10, 1959 |
| 2,913,595 | Kaufmann | Nov. 17, 1959 |
| 2,926,339 | Kramer et al. | Feb. 23, 1960 |
| 2,930,903 | Andrews | Mar. 29, 1960 |
| 3,015,808 | DeTroye | Jan. 2, 1962 |